United States Patent

Eichweber

[11] Patent Number: 4,917,609
[45] Date of Patent: Apr. 17, 1990

[54] ARRANGEMENT FOR FIRING SIMULATION AND BATTLE SIMULATION

[75] Inventor: Kurt Eichweber, Hamburg, Fed. Rep. of Germany

[73] Assignee: Precitronic Gesellschaft fur Feinmechanik und Electronic mbH, Fed. Rep. of Germany

[21] Appl. No.: 265,046
[22] Filed: Oct. 31, 1988

[30] Foreign Application Priority Data

Jul. 25, 1988 [DE] Fed. Rep. of Germany ....... 3825326

[51] Int. Cl.$^4$ ................................................. F41G 3/26
[52] U.S. Cl. ....................................... 434/20; 434/21; 434/43; 434/44
[58] Field of Search ................. 434/20, 21, 43, 44, 19

[56] References Cited

U.S. PATENT DOCUMENTS

| 4,015,080 | 3/1977 | Moore-Searson | 434/43 |
| 4,349,337 | 9/1982 | Pardes | 434/20 |
| 4,439,156 | 3/1984 | Marshall et al. | 434/20 |
| 4,534,735 | 8/1985 | Allard et al. | 434/20 |
| 4,652,870 | 3/1987 | Steward | 434/44 |

Primary Examiner—Edward M. Coven
Assistant Examiner—Jessica J. Harrison
Attorney, Agent, or Firm—Handal & Morofsky

[57] ABSTRACT

The arrangement for firing simulation and battle simulation, for reflecting images generated by means of a computer (12) into the beam path (15) of a sighting device which has a cathode-ray tube (5, 6) for producing the images, is designed in such a way that it can be used even in widely varying external brightness. For this purpose, the cathode-ray tube (5, 6) emits essentially monochromatic light, while a narrow-band absorption filter (16) for the wavelength of the cathode-ray tube (5, 6) is located in the beam path (15) of the sight outside the beam path of the generated images.

20 Claims, 2 Drawing Sheets

ARRANGEMENT FOR FIRING SIMULATION AND BATTLE SIMULATION

SUMMARY OF THE INVENTION

The invention relates to an arrangement for firing simulation and battle simulation, for reflecting images generated by means of a computer into the beam path of a sighting device which has a cathode-ray tube for producing the images.

In such a known arrangement, the image of a target, a missile or the like can be reflected into the image of the natural scenario which the trainee sees through the sighting device. However, the problem of very large differences in brightness occurring in nature arises here. The differences between bright daylight, especially in sunshine, and poor lighting conditions, for example at night, are many orders of magnitude larger than the differences in brightness which a cathode-ray tube is capable of providing. Consequently, the image reflected into the sighting device from the screen of the cathode-ray tube will either be too bright, in great darkness, or so dark and weak, when the landscape is very bright, that it can no longer be seen against the bright background.

The object of the invention is to provide an arrangement of the type mentioned in the introduction, by means of which work can be carried out satisfactorily and without major readjustments, even under widely varying light conditions.

In the solution according to the invention for achieving the object, the cathode-ray tube emits essentially monochromatic light, and a narrow-band absorption filter for the wavelength of the light from the cathode-ray tube is located in the beam path of the sight outside the beam path of the generated images.

The image of the landscape is therefore transmitted to the trainee's eye only after it has been filtered in terms of the wavelength. The wavelength range corresponding to the wavelength range of the cathode-ray tube is filtered out. Now the image from the cathode-ray tube falls within this filtered-out wavelength range, so that in a surprising way it can be seen substantially more clearly. At the same time, the bright light in the adjacent wavelength ranges causes substantially less disturbance or none at all. This result is surprising because one would assume, instead, that it would not be possible to achieve such an improvement by blanking out a small wavelength range and consequently only a small fraction of the total intensity. The merit of the invention is that it has overcome this prejudice.

Advantageously, two cathode-ray tubes which emit light of different wavelengths are used, two absorption filters being provided for these wavelengths. In this case, there is a possibility of producing different images of differing colours on the two cathode-ray tubes. It would be possible, for example, to display targets on one cathode-ray tube, whilst tracers, missiles or simulated detonations in the event of hits at the target location can be displayed on the other cathode-ray tube.

Dichroic filters having proved especially advantageous.

Expediently, the absorption filters have a bandwidth of approximately ±30 nm to 60 nm.

It is especially expedient if the arrangement has semipermeable mirrors, by means of which the generated images are reflected into the beam path of the sight.

When the trainee looks through the sight, he sees the natural scenario, into which imaginary targets and imaginary hit events, etc. can then be reflected. If a third cathode-ray tube and devices for producing in this landscape images which are generated by a computer are provided, on the one hand the sight can be used with natural scenario by cutting out the third cathode-ray tube. However, the lens aperture of the sight can also be closed and, instead of the natural scenario, an artificial scenario produced by means of the third cathoderay tube. The sighting device is thus more versatile.

An essential advantage of the arrangement is that it can be designed as a separate unit mountable in front of a sighting device. It can then be used for training with completely normal guns and the like, without major readjustments being necessary. The separate arrangement according to the invention merely needs to be inserted into the beam path of the sighting device.

The imaginary targets can be generated automatically. However, the movement of these targets can also be controlled manually by an instructor. The action becomes especially realistic if not only the location, but also the size of the imaginary target on the cathode-ray tube can be varied.

The entire firing simulation and battle simulation is thus computer-assisted, and the movement of the weapon, possible travels of the weapon, ballistic projectories of imaginary projectiles, correction angles, etc. are then also taken into account automatically by the computer, in order thereby to obtain action which is as true to nature as possible.

BRIEF DESCRIPTION OF THE DRAWINGS

The invention is described below by means of advantageous embodiments with reference to the accompanying drawings. In these.

DESCRIPTION OF THE PREFERRED EMBODIMENTS

The sighting device of the invention has a telescope-like tube (1) possessing an eyepiece (2) at one end and an objective (3) at the other end. The gunner looks through this sight with his eye (4), and reticules and the like can also be provided in a known way in the sighting device.

Figure 1:
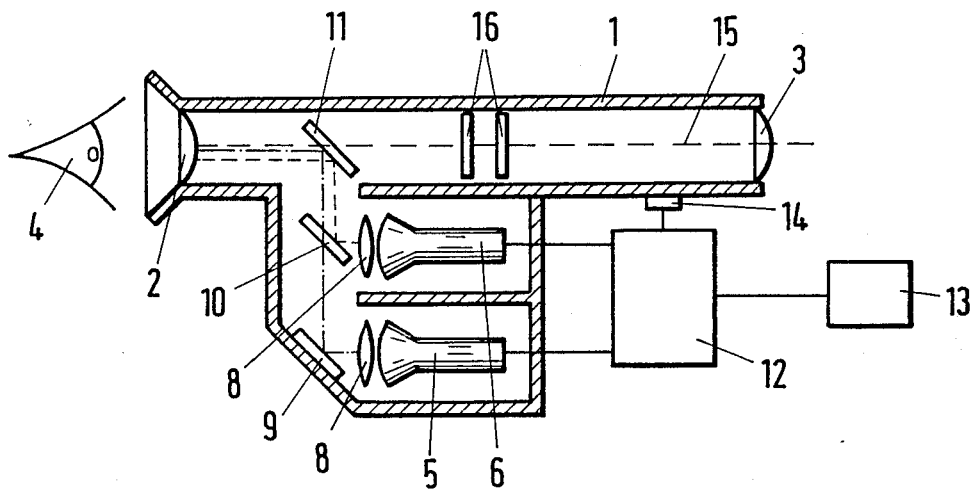
FIG. 1 shows a cross-section through a first embodiment of a sighting device of the invention.

Located underneath the tube (1) are two cathode-ray tubes (5, 6), the longitudinal axis of which is parallel to the longitudinal axis of the tube (1) in the embodiment of FIG. 1. The images on the screens of these cathode-ray tubes (5, 6) are transmitted to the observer's eye (4) via lenses (8), a mirror (9) and a semipermeable mirror (10), which are located respectively in front of the cathode-ray tubes (5, 6), and a further semipermeable mirror (11) located in the beam path of the sight. At the same time, the images on the cathode-ray tubes (5, 6) are produced by means of a computer (12), and the events can also be controlled by an instructor by means of an input unit (13). At the same time movements of the weapon system are signalled to the computer (12) via a sensor (14), so that the instantaneous location, the alignment and the speed of angular changes and changes of location can be taken into account by the computer (12).

Also located in the beam path (15) of the sighting device are two absorption filters (16) absorbing light, the wavelength of which corresponds to the wavelength of the light emitted by the cathode-ray tubes (5) and (6) radiating essentially monochromatic light. Both the wavelength range of the cathode-ray tube (5) and that of the cathode-ray tube (6) are thus blanked out from the image of the landscape by means of the two filters (16), so that the trainee can see the images from the cathode-ray tubes (5) and (6) even under very bright conditions. At the same time, on the one hand targets and on the other hand events, such as missiles, tracers and hit explosions, which are produced by means of the computer (12) can be displayed on the cathode-ray tubes.

Figure 2:
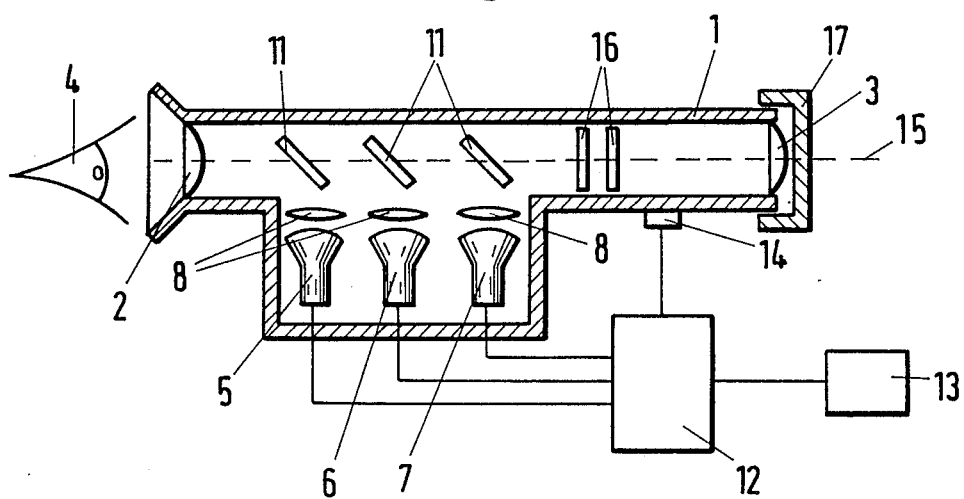
FIG. 2 shows a second embodiment in section and in a represenation similar to that of FIG. 1.

In the embodiment of FIG. 2, located in succession in the beam path (15) of the sighting device (3) are semipermeable mirrors which guide the light from three cathode-ray tubes (5, 6, 7) via lenses (8) into the observer's eye (4). On the one hand, the mode of operation can be as in the embodiment of FIG. 1, in which targets and events are displayed on the cathode-ray tubes (5, 6), whilst the cathode-ray tube (7) is cut out. On the other hand, however, an artificial scenario can also be generated on the cathode-ray tube (7) by means of the computer (12) and then reflected into the sight. So that the background landscape which the gunner would otherwise see through the sight does not cause any disturbance, the eyepiece aperture is covered with a cap (17) for this purpose.

Figure 3:
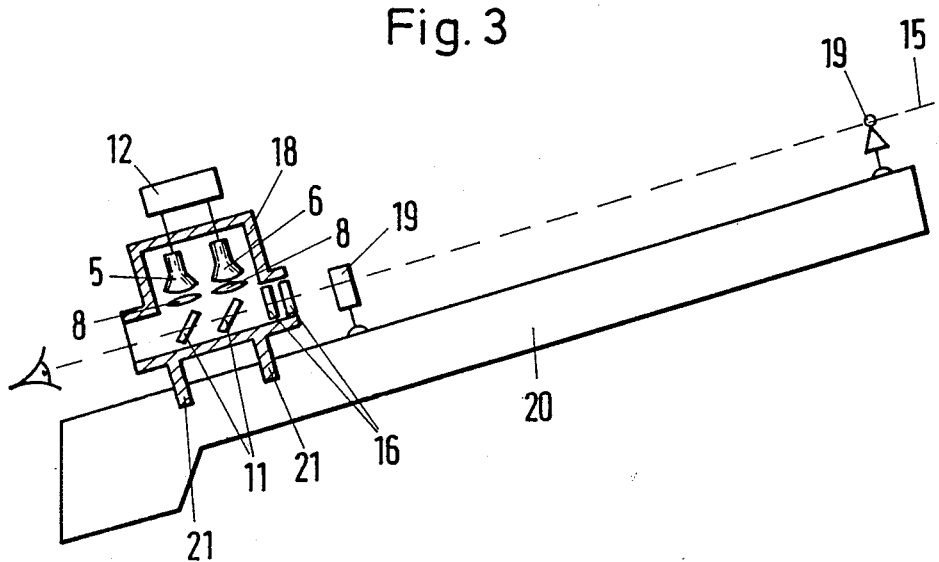
FIG. 3 shows a third device of the invention to be attached separately to a gun.

The embodiment of FIG. 3 is designed as a separate unit (18) which can be inserted into the beam path of a sight (19) of a weapon (20). For this purpose, the unit (18) is equipped with appropriate projections (21), by means of which it can be fastened to the weapon (20) in such a way that it is located in the line of sight (15). As in the embodiments described previously, the unit (18) is equipped with cathode-ray tubes (5, 6), with lenses (8) and with semipermeable mirrors (11) and narrow-band absorption filters (16).

I claim:

1. Arrangement for firing simulation and battle simulation, for reflecting images generated by means of a computer into the beam path of a sighting device which has at least one cathode-ray tube for producing said images, wherein said cathode-ray tube emits essentially monochromatic light, said arrangement further comprising at least one narrow-band absorption filter for the wavelength of the light emitted from said cathode-ray tube located in said beam path of the sight outside the beam path of the generated images.

2. Arrangement according to claim 1, wherein said arrangement has two cathode-ray tubes which emit light of different wavelengths, and in that two absorption filters for these wavelengths are provided.

3. Arrangement according to claim 2, further comprising circuits for producing imaginary targets in one cathode-ray tube and tracer images and hit-event images in the other cathode-ray tube.

4. Arrangement according to claim 3, wherein said imaginary targets can be generated automatically.

5. Arrangement according to claim 3, wherein said imaginary targets can be controlled manually.

6. Arrangement according to claim 3, wherein not only the location, but also the size of said imaginary target on the cathoderay tube can be varied.

7. Arrangement according to claim 2, further comprising a third cathode-ray tube and devices for producing landscape images which are generated by a computer.

8. Arrangement according to claim 1, wherein said at least one absorption filter is a dichroic filter.

9. Arrangement according to claim 1, wherein said absorption filter has a bandwidth which amply covers the wavelength of said cathode-ray tube.

10. Arrangement according to claim 1, further comprising at least one semipermeable mirror, by means of which the generated images are reflected in said beam path of the sight.

11. Arrangement according to claim 1, wherein said arrangement is designed as a separate unit mountable in front of said sighting device.

12. An arrangement as claimed in claim 1, wherein said at least one narrow-band absorption filter has a band width of 30 to 60 nanometers.

13. In an arrangement for firing simulation and battle simulation of the class wherein a target cathode ray tube produces image to be superimposed upon a sighting beam path the improvement comprising a monochromatic image produced by said cathode ray tube to be superimposed upon said sighting beam path and a narrow-band absorption filter, said narrow-band absoprtion filter absorbing light of the same wavelength of said monochromatic image, wherein said narrow-band filter is placed along said sighting beam path at a point before said image is superimposed.

14. An arrangement as claimed in claim 13 further comprising a second cathode ray tube that produces a monochromatic image at a different wavelength than said target cathode ray tube image and a second narrow-band filter corresponding to the wavelength of said second cathode ray tube.

15. An arrangement as claimed in claim 14, further comprising a third cathode ray tube that produces a monochromatic image at a different wavelength than said target cathode ray tube image and said second cathode ray tube image and a third narrow-band filter corresponding to the wavelength of said third cathode ray tube.

16. An arrangement as claimed in claim 13, further comprising at least one semipermeable mirror positioned to superimpose said monochromatic image upon said sighting beam path.

17. An arrangement as claimed in claim 13, wherein said narrow-band filter is a dicroic filter.

18. An arrangement as claimed in claim 13, wherein said narrow-band filter has a bandwidth of approximately 300 angstroms.

19. An arrangement as claimed in claim 13, further comprising a computer to control said images.

20. An arrangement as claimed in claim 19, further comprising a motion sensor to detect movement of said sighting beam path wherein said motion sensor is in communication with said computer.

* * * * *